United States Patent [19]

Rock et al.

[11] Patent Number: 4,657,987

[45] Date of Patent: Apr. 14, 1987

[54] POLYETHERIMIDE-POLYAMIDE BLENDS

[75] Inventors: John A. Rock, Becket; Harold F. Giles, Jr., Cheshire, both of Mass.

[73] Assignee: General Electric Company, Pittsfield, Mass.

[21] Appl. No.: 749,712

[22] Filed: Jun. 28, 1985

Related U.S. Application Data

[63] Continuation-in-part of Ser. No. 574,464, Jan. 27, 1984, abandoned, which is a continuation-in-part of Ser. No. 359,256, Mar. 18, 1982, abandoned.

[51] Int. Cl.$^4$ .............................................. C08L 77/00
[52] U.S. Cl. ..................................... 525/432; 525/431
[58] Field of Search ................................ 525/432, 431

[56] References Cited

U.S. PATENT DOCUMENTS 4,258,155  3/1981  Holub et al. ...................... 525/432
4,332,929  6/1982  Holub et al. ...................... 528/26

FOREIGN PATENT DOCUMENTS 0104659  4/1984  European Pat. Off. .

Primary Examiner—John C. Bleutge
Assistant Examiner—A. L. Carrillo
Attorney, Agent, or Firm—Bernard, Rothwell & Brown

[57] ABSTRACT

Polyamide-polyetherimide blends containing from 5% to 39% by weight of polyetherimide have been found to have improved mold shrinkage and water absorption characteristics.

12 Claims, No Drawings

POLYETHERIMIDE-POLYAMIDE BLENDS

BACKGROUND OF THE INVENTION

This application is a continuation in part of copending U.S. patent application Ser. No. 574,464, filed Jan. 27, 1984, now abandoned, which in turn was a continuation in part of Ser. No. 359,256, filed Mar. 18, 1982, now abandoned.

Polyetherimide-polyamide blends have been prepared to maintain the flexural and tensile properties of the polyetherimide while lowering the overall cost of the polymer. Such blends have also recently been associated with lower molding temperatures and superior chemical resistances when compared to the polyetherimide component alone. (See European Patent Application No. 83109701.9, publication No. 0 104 659.)

SUMMARY OF THE INVENTION

In accordance with the present invention, a polymer blend contains (a) a polyetherimide and (b) a polyamide, wherein the polyetherimide comprises from 5% to 39% of the blend by weight and wherein the polyetherimide is represented by the formula hereinafter described. It has been discovered that by incorporating a minor proportion of polyetherimide into polyamides, the molding characteristics of the polyamide can be significantly improved. In particular, such blends have been found to exhibit substantially less mold shrinkage than the polyamide alone. Morover, the blends are less susceptible to water absorption then unmodified polyamides, which improves the quality of molded articles.

DETAILED DESCRIPTION OF THE INVENTION

The blends of the invention include a polyetherimide of the formula:

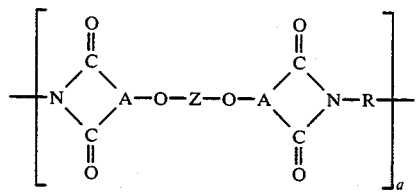

where a represents a whole number in excess of 1, e.g., 10 to 10,000 or more, the group

is selected from:

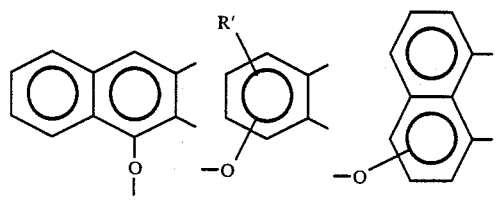

R' being hydrogen, lower alkyl or lower alkoxy, preferably the polyetherimide includes the latter

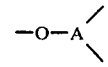

group where R' is hydrogen such that the polyetherimide is of the formula:

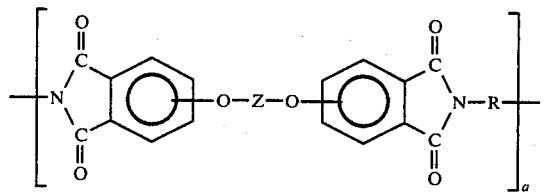

and the divalent bonds of the —O—Z—O— radical are in the 3,3'; 3,4'; 4,3' or the 4,4' position; and Z is a member of the class consisting of (1)

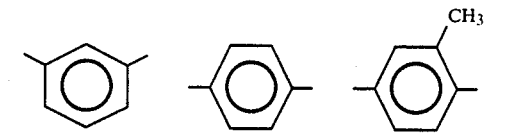

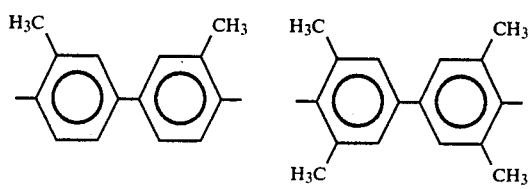

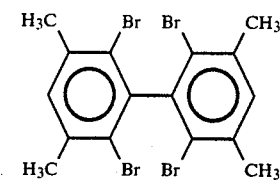

and (2) divalent organic radicals of the general formula:

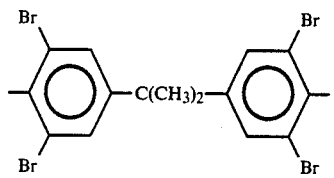

where X is a member selected from the class consisting of divalent radicals of the formulas,

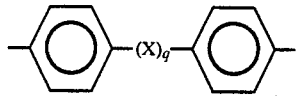

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals includes by the formula

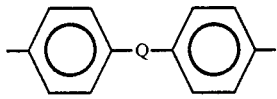

where Q is a member selected from the class consisting of

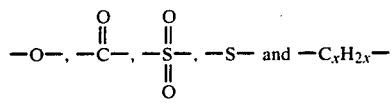

where x is a whole number from 1 to 5 inclusive. Particularly preferred polyetherimides for the purposes of the present invention include those where

and Z respectively are:

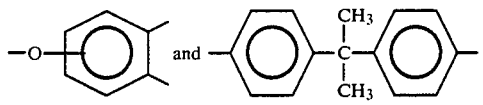

and R is selected from:

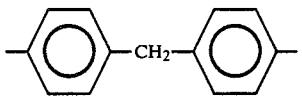

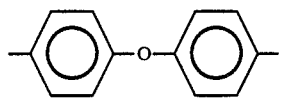

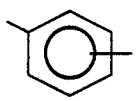

The polyetherimides where R is metaphenylene are most preferred.

The blends of the invention also include a polyamide. Polyamides are well known in the art and the term embraces those semi-crystalline and amorphous resins having a molecular weight of at least 5000 commonly referred to as nylons. Polyamides generally have repeating structural units represented by the general formula;

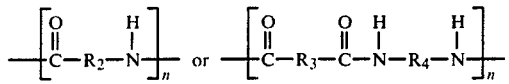

wherein $R_2$, $R_3$, and $R_4$, which may be the same or different, each represents an alkylene group having from 4 to 11 carbon atoms, and n is an integer of 30 to 500 or more. Suitable examples of alkylene groups containing 4 to 11 carbon atoms for $R_2$, $R_3$, and $R_4$ include a tetramethylene group, a pentamethylene group, a hexamethylene group, a heptamethylene group, an octamethylene group, a nonamethylene group, decamethylene group, an undecamethylene group, and the like.

Specifically, the following polyamides may be incorporated in the blends of the invention:
polyhexamethylene adipamide (nylon 6:6)
polypyrrolidone (nylon 4)
polycaprolactam (nylon 6)
polyheptolactam (nylon 7)
polycapryllactam (nylon 8)
polynonanolactam (nylon 9)
polyundecanolactam (nylon 11)
polydodecanolactam (nylon 12)
polyhexamethylene azelaiamide (nylon 6:9)
polyhexamethylene sebacamide (nylon 6:10)
polyhexamethylene isophthalamide (nylon 6:ip)
polymetaxylylene adipamide (nylon MXD:6)
polyamide of hexamethylendediamine and ndodecanedioic acid (nylon 6:12)
polyamide of dodecamethylenediamine and ndodecanedioic acid (nylon 12:12)

Nylon copolymers may also be used as the polyamide component of the blends of this invention. For example, suitable copolymers include the following:
hexamethylene adipamide/caprolactam (nylon 6:6/6)
hexamethylene adipamide/hexamethylene-isophthalamide (nylon 6:6/6ip)
hexamethylene adipamide/hexamethylene-terephthalamide (nylon 6:6/6T)
trimethylhexamethylene oxamide/hexamethylene oxamide (nylon trimethyl-6:2/6:2)
hexamethylene adipamide/hexamethylene-azelaiamide (nylon 6:6/6:9)
hexamethylene adipamide/hexamethylene-azelaiamide/caprolactam (nylon 6:6/6:9/6)

Also useful is nylon 6:3 produced by Dynamit Nobel. This polyamide is the product of the dimethyl ester of terephthalic acid and a mixture of isomeric trimethyl hexamethylenediamine. Preferred nylons for the blends of the invention include 6,6:6; 11, 12, 6:3 and 6:12.

In addition, specific polyamides are described in U.S. Pat. Nos. 2,071,250; 2,071,251; 2,130,523; 2,130,948; 2,241,322; 2,312,966; 2,512,606 and 3,393,210.

The polyetherimides can be obtained by any of the methods well known to those skilled in the art including the reaction of any aromatic bis(ether anhydrides) of the formula

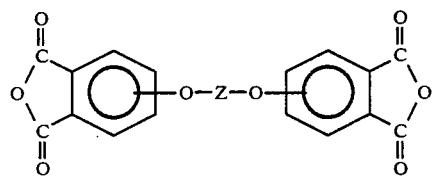

where Z is as defined hereinbefore with an organic diamine of the formula

H₂N—R—NH₂ where R is as defined hereinbefore.

Aromatic bis(ether anyhdride)s of the above formula include, for example, 2,2-bis[4-(2,3-dicarboxyphenoxy)phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'(3,4-dicarboxyphenoxy)diphenyl-2,2-propane dianhydride; etc., and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5diaminonaphthalene, 3,3'-diaminodiphenyl ether, 1,5diaminonaphthalene, 3,3'-dimenthylbenzidine, 3,3'-dimethoxybenzidine, 2,4-bis(β-amino-t-butyl)toluene, bis(p-β-amino-t-butylphenyl)ether, bis(p-β-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis (3-aminopropyl)amine, hexamethylenediame, heptamethylenediamine, nonamethylenediamine, decamethylenediamine, bis(3-aminopropyl) tetramethyldisiloxane, bis(4-aminobutyl) tetramethyldisiloxane, and the like.

In general, the reactions can be advantageously carried out employing well-known solvents, e.g., o-dichlorobenzene, m-cresol/dianhydrides and the diamines, at temperatures of from about 100° to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity greater than 0.2 deciliters per gram, preferably 0.35 to 0.60, or 0.7 deciliters per gram or even higher than measured in m-cresol at 25° C.

Included among the many methods of making the polyetherimides are those disclosed in U.S. Pat. Nos. 3,847,867, Heath et al., 3,847,869, Williams, 3,850,885, Takekoshi et al., 3,852,242 White, and 3,855,178, etc. These disclosures are incorporated herein in their entirety by reference for the purpose of teaching, by way of illustration, general and specific methods for preparing polyetherimides suitable for the blends of this invention.

Polyamides may be obtained by polymerizing a monoaminomonocarboxylic acid or an internal lactam thereof having at least two carbon atoms between the amino and carboxylic acid groups; or by polymerizing substantially equimolar proportions of a diamine which contains at least two carbon atoms between the amino groups and a dicarboxylic acid; or by polymerizing a monoaminocarboxylic acid or an internal lactam thereof as defined above substantially equimolecular proportions of a diamine and a dicarboxylic acid. The dicarboxylic acid may be used in the form of a functional derivative thereof, for example, an ester.

The term "substantially equimolecular proportions" (of the diamine and of the dicarboxylic acid) is used to comprehend both strict equimolecular proportions and the slight departures therefrom which are involved in conventional techniques for stablizing the viscosity of the resultant polyamides.

As examples of the monoaminomonocarboxylic acids or lactams thereof, there may be mentioned those compounds containing from 2 to 16 carbon atoms between the amino and carboxylic acid groups, the carbon atoms forming a ring with the —CO—NH— group in the case of a lactam. As particular examples of aminocarboxylic acids and lactams there may be mentioned ε-aminocaproic acid, butyrolactam, pivalolactam, caprolactam, capryl-lactam, enantholactam, undecanolactam, dodecanolactam and 3- and 4-amino benzoic acids.

Examples of suitable diamines are diamines of the general formula H₂N(CH₂)ₙNH₂ wherein n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine. C-alkylated diamines, e.g., 2,2-dimethylpentamethylenediamine and 2,2,4- and 2,4,4-trimethylhexamethylenediamine are further examples. Other diamines which may be mentioned as examples are aromatic diamines, e.g., p-phenylenediamine, 4,4'-diaminodiphenyl sulfone, 4,4'-diaminodiphenyl ether and 4,4'-diaminodiphenyl sulfone, 4,4'-diaminodiphenyl ether and 4,4'-diaminodiphenylmethane; and cycloaliphatic diamines, for example, diaminodicyclohexylmethane.

The dicarboxylic acids may be aromatic, for example, isophthalic and terephthalic acids. Preferred dicarboxylic acids are of the formula HOOC—Y—COOH wherein Y represents a divalent aliphatic radical containing at least two carbon atoms, and examples of such acids are sebacic acid, octadecanedioic acid, suberic acid, azelaic acid, undecanedioic acid, glutaric acid, pimelic acid, and especially adipic acid. Oxalic acid is also a preferred acid.

The blends of the present invention comprise from 5% to 39% by weight of the polyetherimide. Preferred blends contain from 10% to 39% by weight, most preferably from 20% to 39% by weight polyetherimide. Within these ranges, substantial improvements in mold shrinkage and water absorption characteristics of the polyamide are observed.

It is contemplated that the polyetherimide-polyamide blends of the present invention may also include other additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more polyamides or two or more polyamides in combination with one or more polyetherimides.

Methods for forming polyetherimide-polyamide blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The particular polyetherimide-polyamide blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectric capacitors, cable and coil wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimide-polyamide blends can also serve in printed circuit applications.

Alternatively, solutions of the blends herein described can be coated on electrical conductors such as copper, aluminum, and the like and thereafter the coated conductor can be heated at elevated temperatures to remove the solvent and to form a continuous coating of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymeric blends of the invention such as by incorporating such fillers as asbestos, glass fibers, talc, quartz, powder, finely divided carbon, silica, and the like into the blends prior to molding. Shaped articles may be formed under heat, or under heat and pressure, in accordance with practices well-known in the art.

The following examples illustrate specific polyetherimide-polyamide blends in accordance with the present invention. It should be understood that the examples are given for the purpose of illustration and do not limit the invention. In the exampes, all parts and percentages are by weight unless otherwise specified.

EXAMPLE I

A series of polyetherimide-nylon 6:6 blends was tested for mold shrinkage using the procedure of ASTM test D955 in all essential details.

The polyetherimide of the blends was prepared from the reaction product of essentially equimolar amounts of 2,2-bis[4-(3,4-dicarboxyphenoxy)phenyl]propane dianhydride and m-phenylene diamine produced at elevated temperature of about 250° to about 300° C. and under a nitrogen atmosphere. The polymer was extruded at about 300° C. to form a strand and mechanically chopped into pellets.

The polyamide used in preparing the blends was a general purpose nylon 6:6 sold under the trademark Zytel 101 by E. I. DuPont de Nemours and Co., Wilmington, Del., U.S.A. Mixtures of the polyetherimide and the polyamide were extruded in a screw type having a temperature profile varying from about 238° to 282° C. and a die temperature of about 238° C. to 288° C. The resulting extrudate was comminuted into pellets and the pellets injection molded into test specimens in a Boy molding machine having a mold temperature of about 66° C. The polymers were injection molded in a disk-shaped mold having an internal diameter of 4 inches (10.16 cm.) and an internal thickness of ⅛ inch (0.323 cm.). The gate was located on the periphery of the mold. The diameter of each specimen was measured at two points (parallel to the flow and perpendicular to the flow) at 2–4 hours after molding and at 48 hours after molding. Mold shrinkage was expressed as the percent of change from the original mold dimensions. The results are shown in Table I below. These results demonstrate that substantial reduction in mold shrinkage of polyamides can be achieved by blending them with minor proportions of polyetherimides.

EXAMPLE II

The polymer blends prepared by the procedures of Example I were tested for water absorption properties using essentially the procedures of ASTM test D570. The polymers were injection molded into a disk-shaped mold having an internal diameter of 2 inches (5.08 cm.) and an internal thickness of ⅛ inch (0.32 cm.). Each specimen was initially weighed after drying for 24 hours at 50° C. and was then immersed in water at 73° F. (23° C.). The specimens were removed from the water at intervals of 24 hours, 4 weeks and 10 weeks, surface water was removed by blotting and the specimens were weighed. Water absorption was expressed as the percentage of weight increase. The results of these tests, which are reported in Table II below, demonstrate that the water absorption capacity of polyamides can be reduced significantly by blending them with minor portions of polyetherimides.

TABLE I

| Component | | | | | | | | |
|---|---|---|---|---|---|---|---|---|
| Polyamides (%) | 100 | | 95 | | 80 | | 61 | |
| Polyetherimide (%) | — | | 5 | | 20 | | 39 | |
| Mold Shrinkage | 2 hr | 48 hr | 2 hr | 48 hr | 2 hr | 48 hr | 2 hr | 48 hr |
| Parallel to Flow (%) | 2.22 | 2.19 | 2.11 | 2.20 | 1.89 | 1.91 | 1.68 | 1.68 |
| Perpendicular to Flow (%) | 2.35 | 2.35 | 2.18 | 2.22 | 1.84 | 1.87 | 1.48 | 1.51 |

TABLE II

| Component | | | | |
|---|---|---|---|---|
| Polyamide (%) | 100 | 95 | 80 | 61 |
| Polyetherimide (%) | — | 5 | 20 | 39 |
| Water Absorption | | | | |
| @ 24 hrs., 73° F. (%) | 0.99 | 0.98 | 0.86 | 0.61 |
| @ 4 weeks, 73° F. (%) | 5.20 | 4.82 | 4.20 | 3.16 |
| @ 10 weeks, 73° F. (%) | 7.87 | 7.28 | 6.24 | 4.63 |

We claim:

1. A composition comprising (a) a polyetherimide and (b) a polyamide, wherein the polyetherimide comprises from 5% to 39% of the blend by weight and wherein the polyetherimide has the formula

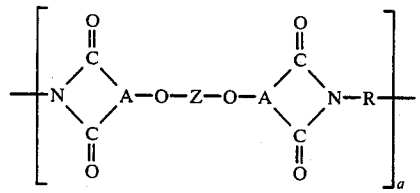

where a represents a whole number in excess of 1, the group

is selected from:

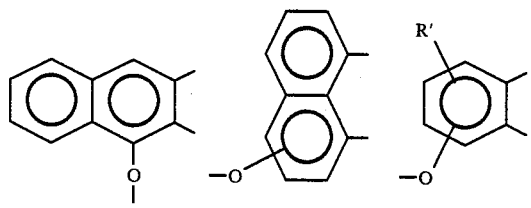

R' being hydrogen, lower alkyl or lower alkoxy, Z is a member of the class consisting of (1)

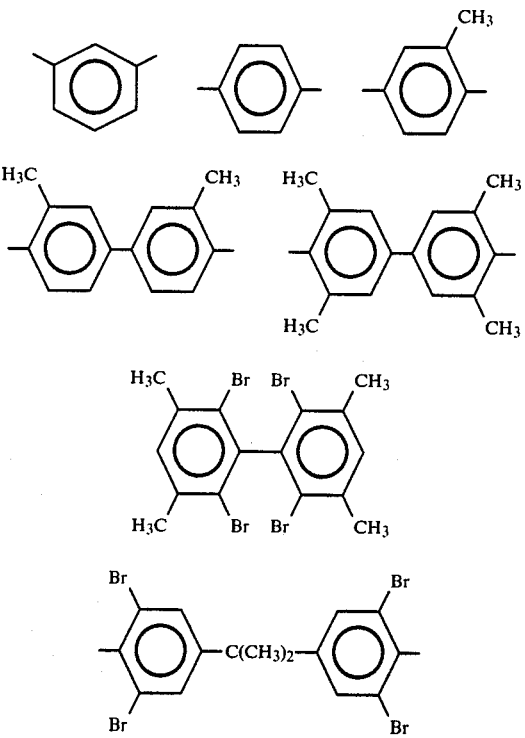

and (2) divalent organic radicals of the general formula:

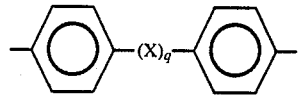

where X is a member selected from the class consisting of divalent radicals of the formulas,

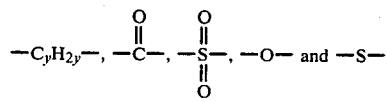

where q is 0 to 1, y is a whole number from 1 to 5, and R is a divalent organic radical selected from the class consisting of (1) aromatic hydrocarbon radicals having from 6-20 carbon atoms and halogenated derivaties thereof, (2) alkylene radicals and cycloalkylene radicals having from 2-20 carbon atoms, and $C_{(2-8)}$ alkylene terminated polydiorganosiloxane, and (3) divalent radicals included by the formula

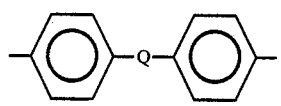

where Q is a member selected from the class consisting of

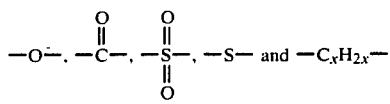

where x is a whole number from 1 to 5 inclusive; and wherein the polyamide has repeating structural units consisting essentially of the formula:

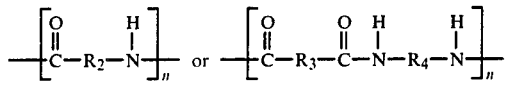

wherein $R_2$, $R_3$ and $R_4$, which may be the same or different, each represents an alkylene group having from 4 to 11 carbon atoms, and n is an integer of 30 to 500 or more.

2. A composition in accordance with claim 1 wherein the polyetherimide is of the formula:

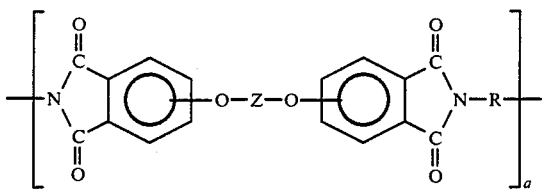

and the divalent bonds of the —O—Z—O— radical being in the 3,3'; 3,4'; 4,3' or the 4,4' position.

3. A composition in accordance with claim 2 wherein Z is;

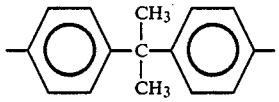

and R is selected from;

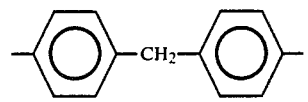

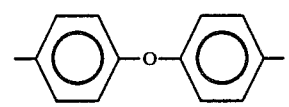

4. A composition in accordance with claim 3, wherein the polyetherimide comprises from 10% to 39% of the blend by weight.

5. A composition in accordance with claim 3, wherein the polyetherimide comprises from 20% to 39% of the blend by weight.

6. A composition in accordance with claim 4 wherein the polyetherimide is of the formula:

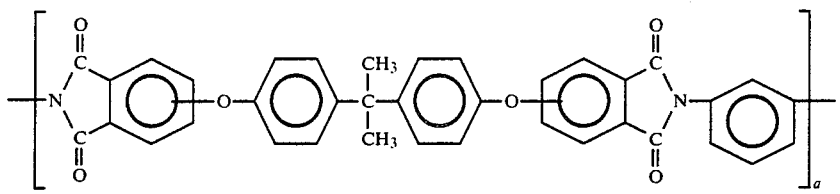

7. A composition in accordance with claim 1 wherein the polyamide is nylon 6:6.

8. A composition in accordance with claim 1 wherein the polyamide is nylon 12.

9. A method for reducing the mold shrinkage of a polyamide which comprises blending with the polyamide a minor proportion of a polyetherimide, wherein the polyetherimide comprises from 5% to 39% by weight of the blend; and wherein the polyamide and polyetherimide are defined as in claim 1.

10. The method of claim 9, wherein the polyetherimide comprises from 10% to 39% by weight of the blend.

11. A method for reducing the water absorption capacity of a polyamide which comprises blending with the polyamide a minor proportion of a polyetherimide, wherein the polyetherimide comprises from 5% to 39% by weight of the blend; and wherein the polyamide and polyetherimide are defined as in claim 1.

12. The method of claim 11, wherein the polyetherimide comprises from 10% to 39% by weight of the blend.

* * * * *